(12) United States Patent
Patel (10) Patent No.: US 7,707,497 B1
(45) Date of Patent: Apr. 27, 2010

(54) PREFIX SAVVY DISPLAYS IN FONT ENUMERATION USER INTERFACES

(75) Inventor: Sairus Patel, Palo Alto, CA (US)

(73) Assignee: Adobe Systems Incorporated, San Jose, CA (US)

( * ) Notice: Subject to any disclaimer, the term of this patent is extended or adjusted under 35 U.S.C. 154(b) by 812 days.

(21) Appl. No.: 11/519,470

(22) Filed: Sep. 12, 2006

(51) Int. Cl.
*G06F 17/21* (2006.01)

(52) U.S. Cl. .................. 715/269; 715/255; 715/256

(58) Field of Classification Search ............... 715/243, 715/256, 269
See application file for complete search history.

(56) References Cited

U.S. PATENT DOCUMENTS

| | | | | |
|---|---|---|---|---|
| 5,563,997 A | * | 10/1996 | Fisher | 715/809 |
| 5,586,242 A | * | 12/1996 | McQueen et al. | 345/467 |
| 7,197,707 B2 | * | 3/2007 | Cicchitelli et al. | 715/269 |
| 7,228,501 B2 | * | 6/2007 | Brown et al. | 715/234 |
| 7,346,845 B2 | * | 3/2008 | Teshima | 715/269 |
| 2002/0085006 A1 | * | 7/2002 | Shade et al. | 345/471 |
| 2004/0221242 A1 | * | 11/2004 | Chen et al. | 715/810 |
| 2008/0028304 A1 | * | 1/2008 | Levantovsky et al. | 715/269 |
| 2008/0065638 A1 | * | 3/2008 | Brodersen et al. | 707/7 |

* cited by examiner

*Primary Examiner*—Joshua D Campbell
*Assistant Examiner*—Christopher Bryant
(74) *Attorney, Agent, or Firm*—Van Pelt, Yi & James LLP (57) ABSTRACT

Displaying font names is disclosed. A list of font names is obtained, where each font name is divided into a prefix portion, if any, and a remainder portion. The list is sorted without considering the prefix portion. The prefix portions are displayed, for those font names that have them, using a first display property and the remainder portions are displayed using a second display property.

25 Claims, 5 Drawing Sheets

PREFIX SAVVY DISPLAYS IN FONT ENUMERATION USER INTERFACES

BACKGROUND OF THE INVENTION

Some typographically advanced applications have a rich selection of fonts where a user is able to select from hundreds or thousands of fonts. For example, designers who develop web pages or advertisements may be extremely concerned about visual aesthetics and font selection may be an important consideration. Simple sort and prefix savvy sort are two techniques for sorting a list of fonts. In simple sort, a list is sorted in alphabetical order using all of the words in a font name. In prefix savvy sort, a prefix portion of a font name is not considered during alphabetizing, and the sort is based on a remaining portion of a name. For example, the font New Caledonia Std includes a prefix of New and a remaining portion of Caledonia Std. Using prefix savvy sort, the font New Caledonia Std would be sorted or grouped under the letter C.

Existing techniques for presenting fonts can be cumbersome or confusing to some users. For example, in some cases, a list of fonts is presented using simple sort but a user prefers prefix savvy sort. When presented with a list of fonts that has been prefix savvy sorted, some users do not understand how the order came about and/or it is difficult to visually detect the sort order. It is particularly inconvenient or frustrating when thousands of fonts are presented to a user. It would be desirable to develop improved techniques for presenting a list of fonts to a user.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Displaying font names is disclosed. A list of font names is obtained, where each font name is divided into a prefix portion, if any, and a remainder portion. The list is sorted without considering the prefix portion. In some embodiments, this type of sort is referred to as prefix savvy sort. The prefix portions are displayed, for those font names that have them, using a first display property and the remainder portions are displayed using a second display property. For example, in some embodiments, prefix portions are aligned in one column and remainder portions are aligned in another column. In some embodiments, a display property is associated with font color, font transparency, font size, font effects. In some embodiments, a display parameter is any effect, parameter, setting, or characteristic associated with displaying or that is visible. For example, in some embodiments, prefixes are displayed using a lighter colored font so that attention is drawn away from a prefix portion; in some embodiments, a remainder portion is emphasized, for example by using bolding, underlining, etc.

Displaying a list of items sorted according to a first sort order and a second sort order is disclosed. A list of items sorted according to a first sort order is displayed in response to selection of a sequence of one or more selections associated with a user interface. For example, in some embodiments a user goes through a sequence of choices via a pull down menu, dialog box, or other interface in order to access or otherwise cause a list of items to be displayed. An indication to display the list of items sorted according to a second sort order is received. For example, in some embodiments, a user presses a prescribed combination of keys to cause such an indication to be triggered. The list of items sorted according to the second sort order is displayed without requiring the sequence of one or more selections associated with the user interface to be selected. For example, in some embodiments the list is displayed in the second sort order without requiring a user to go through a sequence of choices via a pull down menu again.

Figure 1:
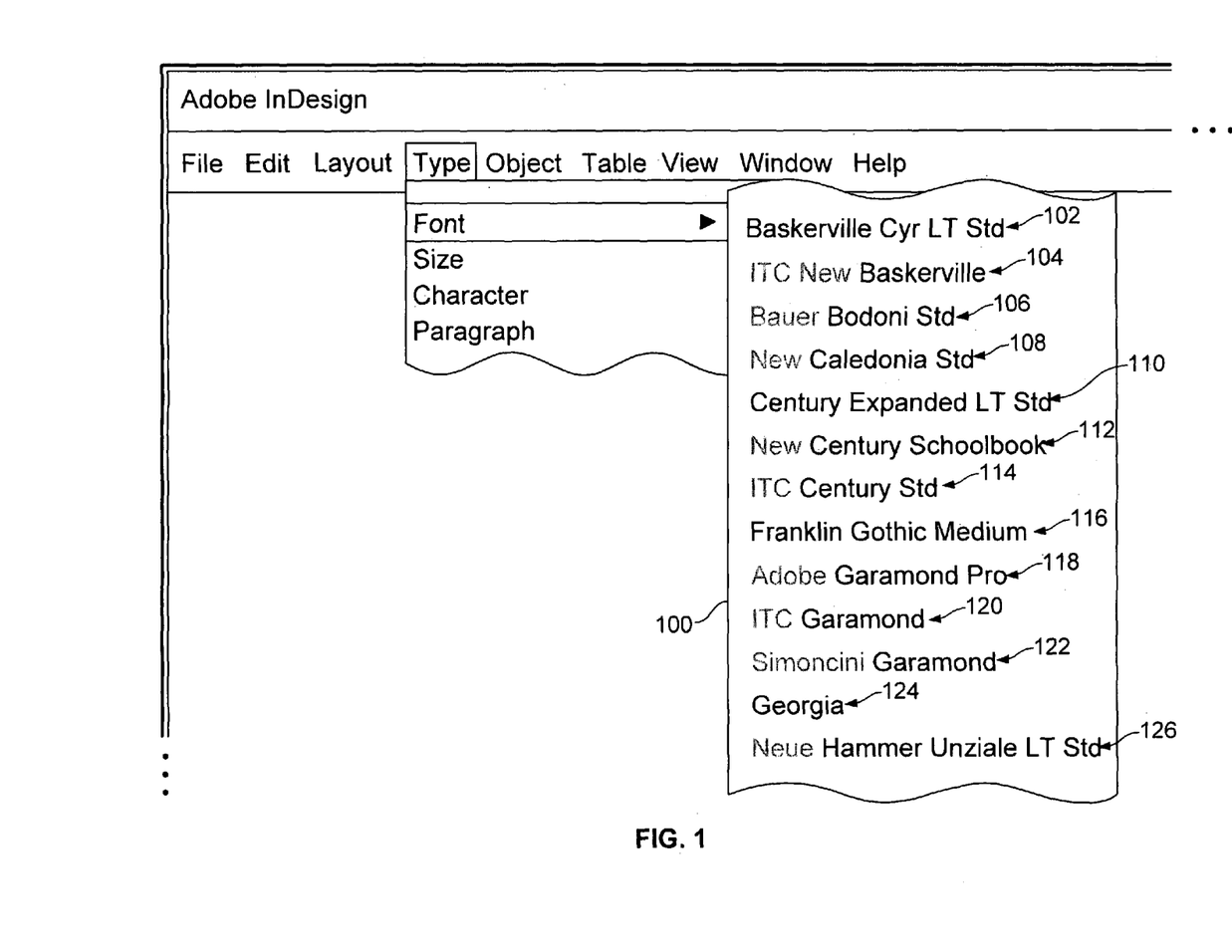
FIG. 1 is a diagram illustrating an embodiment of a list of fonts that are displayed via a pull down menu.

FIG. 1 is a diagram illustrating an embodiment of a list of fonts that are displayed via a pull down menu. In the example shown, font list 100 is sorted using prefix savvy sort. In prefix savvy sort, a font name is divided into a prefix portion and a remainder portion. For example, Simoncini Garamond (122) in font list 100 has a prefix portion comprising of Simoncini and a remainder portion comprising of Garamond. In some cases, a font name does not include a prefix (e.g., Century Expanded LT Std (110)). Prefixes are not considered during a prefix savvy sort and font names are sorted alphabetically as if a name did not include a prefix. For example, Bauer Bodoni Std (106) is sorted as if the name did not include Bauer. Simple sort, on the other hand, takes prefixes into consideration when sorting a list. Using simple sort, Bauer Bodoni Std (106) is, for example, sorted based on Bauer.

In the example shown, prefixes are displayed using one display property and the remainder portions are displayed using another display property. In this case, the display parameters are associated with font color. Prefixes in font list 100 (for those font names that have them) are displayed using a lighter font color or shade. By using a lighter color to display a prefix portion, a user may be able to more easily figure out how prefix savvy sorting works or how division into prefixes/remainders is performed since it is more apparent that Baskerville Cyr LT Std (102) is sorted based on Baskerville, ITC New Baskerville (104) is sorted based on Baskerville, Bauer Bodoni Std (106) is sorted based on Bodoni, New Caledonia Std (108) is sorted based on Caledonia, Century Expanded LT Std (110) is sorted based on Century, New Century Schoolbook (112) is sorted based on Century, ITC Century Std (114) is sorted based on Century, Franklin Gothic Medium (116) is sorted based on Franklin, Adobe Garamond Pro (118) is sorted based on Garamond, ITC Garamond (120) is sorted based on Garamond, Simoncini Garamond (122) is sorted based on Garamond, Georgia (124) is sorted based on Georgia, and Neue Hammer Unziale LT Std (126) is sorted based on Hammer. Some existing user interfaces display the prefix (if any) and remainder portions of a font name using the same color. With the same color, it may not be as readily apparent to a user why, for example, ITC New Baskerville (104) follows Baskerville Cyr LT Std (102) in font list 100.

Using different font colors or shades is one example technique for different display properties that are used to display a list of fonts that are prefix savvy sorted. In some embodiments, display properties are used to de-emphasize prefixes in a prefix savvy sorted list of font names. In some embodiments, display properties are used to actively or deliberately draw attention to a remainder portion. Any visual effect including italics, bold, underlining, font size, coloring/shading, a degree of transparency, embossing (e.g., providing the illusion or impression of three dimensions), and/or highlighting can be used as a display property when displaying a prefix savvy sorted list of font names. In some embodiments, a display property is associated with alignment or placement. In some embodiments, a display property is dynamic or time varying effect, such as blinking or flashing. In some embodiments, multiple or a combination of visual effects or display properties are used when displaying a list of fonts that are prefix savvy sorted.

In some cases, a prefix includes the name of a font foundry or font designer. For example, Adobe Garamond Pro (118), ITC Garamond (12), and Simoncini Garamond (122) in font list 100 are derived from or otherwise associated with the Garamond of Claude Garamond and/or Jean Jannon. The font Adobe Garamond Pro (118) includes the name of the foundry Adobe, the font ITC Garamond 120 includes the name of the foundry International Typeface Fonts (ITC), and the font Simoncini Garamond (122) includes the name of type designer Francesco Simoncini. In some cases, a prefix comprises of New (e.g., New Caledonia Std 108) or Neue (e.g., Neue Hammer Unziale LT Std 126).

In some embodiments, prefixes are identified by a type designer or a foundry. In some applications, this is desirable since some designers or foundries want to have control over what comprises a prefix, if any. In some embodiments, someone associated with an application that displays a list of fonts identifies or otherwise determines prefixes. For example, in some applications a consistent display of a list of fonts is desirable. In some cases, one foundry identifies their foundry name but another foundry does not and as a result the list may be confusing and/or inconsistent. If someone associated with Adobe® InDesign® (in the case of this example) identifies the prefixes in font names, division into a prefix portion and a remainder portion may be performed in a more consistent fashion. In some embodiments, consistency is maintained across multiple applications. For example, in some embodiments, an indication of how a font name is divided into a prefix portion and a remainder portion is stored in a central or common location (e.g., an TrueType and OpenType file or other file that defines or describes a font) which the various applications access. This may enable different applications to use the same information and thus display a list of fonts in a consistent manner.

Any appropriate prefix savvy sort and/or simple sort technique can be used with the techniques disclosed herein. For example, one developer of software applications may have one technique for prefix savvy sorting and another developer may have another technique for prefix savvy sorting. Although in different software applications, the lists of font names may not necessarily be sorted in the same order (e.g., if different prefix savvy sort techniques are used), the techniques disclosed herein are applicable to lists sorted using a variety of sort techniques. Any sorting method can be used in combination with the techniques and concepts described herein.

In this example, font list 100 is displayed in a user interface associated with Adobe InDesign. In some embodiments, a font list is displayed in a user interface associated with some other application. For example, font list 100 or some similar list may be displayed in applications associated with desktop publishing, webpage development, graphic design applications, document layout applications, etc. In some embodiments, techniques described herein are used with Adobe® Creative Suite®, Adobe® Illustrator®, Adobe® Photoshop®, or Flash®.

In some embodiments, a list of fonts is displayed in response to a sequence of choices associated with some other user interface object or tool besides a pull down menu. For example, rather than making a selection from a pull down menu, in some embodiments, a button labeled Fonts is pressed using a mouse. In some embodiments, a list of fonts is presented to a user in a dialog box or tool window that remains open while a user works on a document, website, or other product. In some embodiments, there is not enough space to display all fonts in a list and up/down arrows are used to navigate or advance through a list of fonts. A list of fonts is presented to a user in various ways in various embodiments. The following figures illustrate some other examples of displaying a font list. In various embodiments, the following example font lists are accessible via a pull down menu, a dialogue box, etc.

Figure 2:
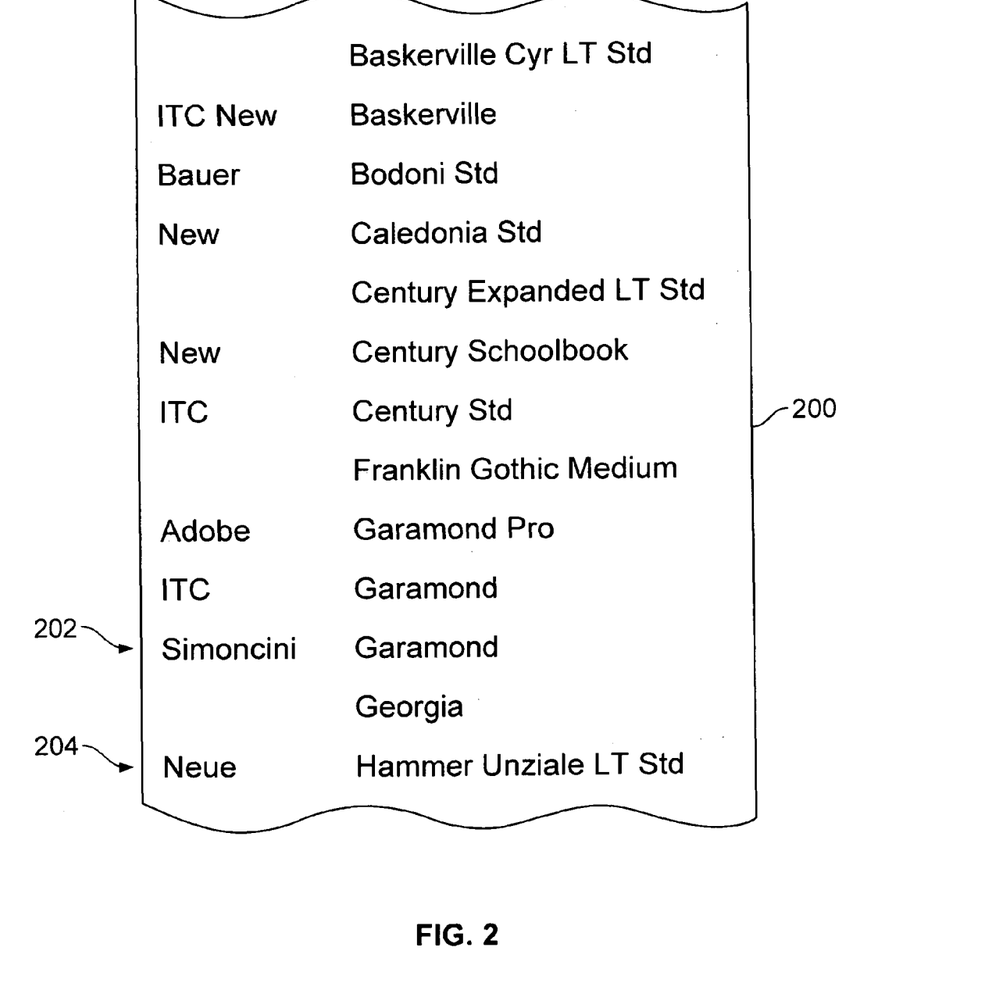
FIG. 2 is a diagram illustrating an embodiment of a font list with prefix portions (if any) in one column and remainder portions in another column.

FIG. 2 is a diagram illustrating an embodiment of a font list with prefix portions (if any) in one column and remainder portions in another column. In the example shown, font list 200 is prefix savvy sorted in the same order as font list 100. However, in this example a different technique is used in displaying the sorted font list. The left column of font list 200 contains the prefix portion of the font names, if any. The right column contains the remainder portion of the font names, which is used to sort the list. With two columns is it more readily apparent to a user how font list 200 is sorted.

In this example, the layout or placement of the prefix and remainder portions of the font name is used to illustrate how font list 200 is sorted. The remainder portion in this example is not necessarily emphasized or accentuated, nor is the prefix portion necessarily de-emphasized. As shown in this example, insight into prefix savvy sort and/or the distinction between prefixes and remainders in some embodiments is provided without necessarily attracting/detracting attention to/from a particular portion of a font name.

In this example, both the left column and the right column are left aligned. In various embodiments, various alignments are used. For example, in some embodiments, the left column is right aligned so that prefix portions and remainder portions are equally spaced. In this example, Simoncini Garamond (202) and Neue Hammer Unziale LT Std (204) have different spacings between their respective prefix and remainder portions. If the left column were to be right aligned, the two font names would have the same spacing between their prefix and remainder portion.

Figure 3:
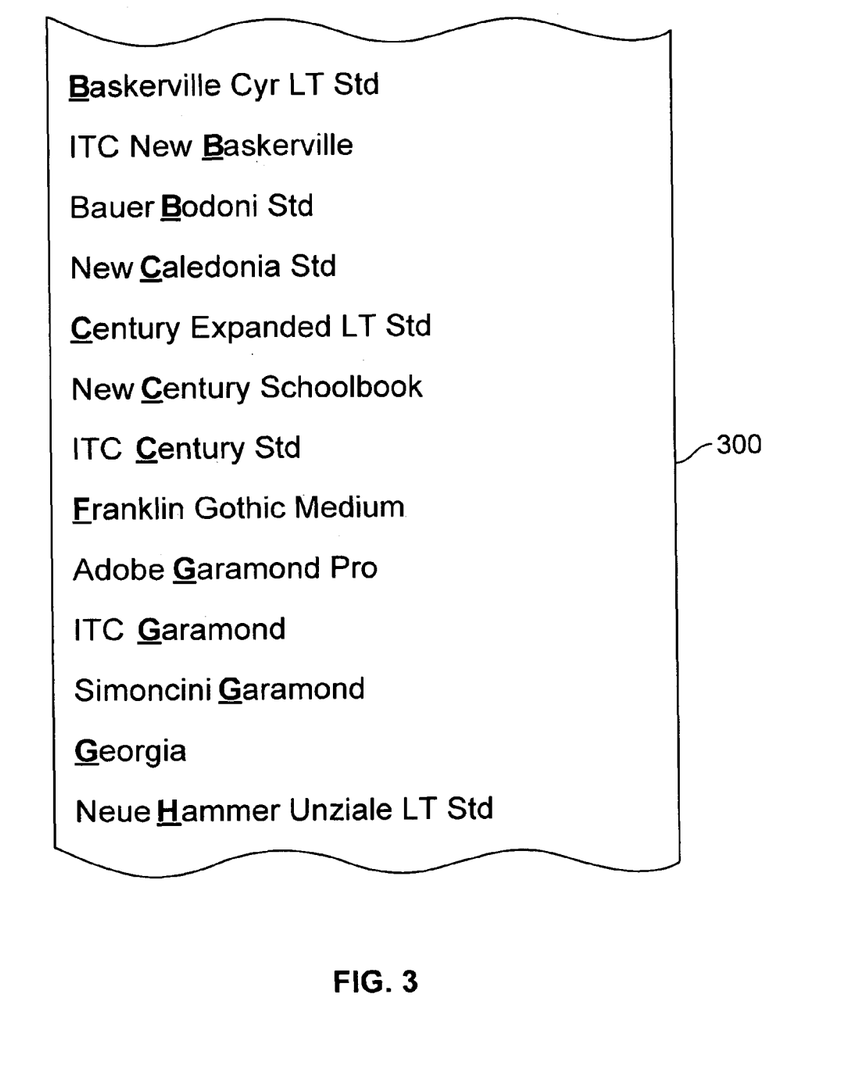
FIG. 3 is a diagram illustrating an embodiment of a font list where the first letter of a remainder portion is displayed with an underline, bold type, and a larger font size.

FIG. 3 is a diagram illustrating an embodiment of a font list where the first letter of a remainder portion is displayed with an underline, bold type, and a larger font size. In the example shown, font list 300 is sorted in the same order as font lists 100 and 200. For each font name displayed in font list 300, the first letter of the remainder portion is emphasized using an underline, bold type, and a larger font size compared to the rest of the name.

In some applications, emphasizing or drawing attention to a letter used in a sort is desirable. For example, if a user is scrolling, jumping, or otherwise advancing through a list of font names, the user would be aware of what letter they are on and/or how much further they need to advance to reach a desired letter. For example, a user may be looking for the font Minion which is sorted under the letter M. When advancing through font list 300, a user may be able to gauge how quickly the letters are changing. For example, if there are hundreds of fonts, the emphasized letters may change relatively slowly when advancing through a list compared to when advancing through a list of a few dozen fonts. As the letter M approaches, a user may be able to slow down a rate of advancement and/or be prepared to stop suddenly. In some scenarios or applications, there may be some other desired effect or design constraint and some other display technique is selected. For example, display area may be a concern and it may be undesirable in some applications to use a larger font size since fewer font names are able to be displayed in the same display area.

In some embodiments, an example technique described herein is used in combination with another example technique or some technique that is not shown. For example, in some embodiments, the example techniques shown in font list 100 and 200 are combined so that there are two columns and the prefix portions of the font names (if any) are displayed in a lighter font color.

Figure 4:
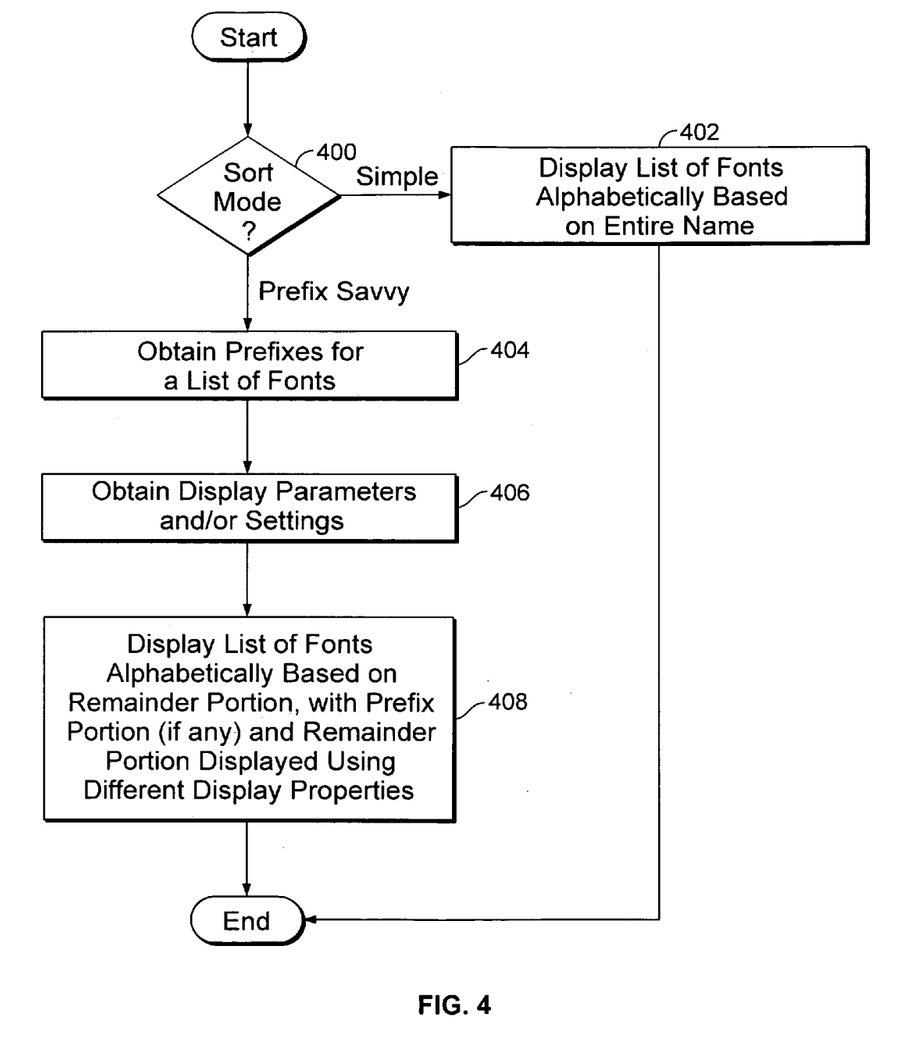
FIG. 4 is a flow chart illustrating an embodiment of a process for displaying a list of fonts.

FIG. 4 is a flow chart illustrating an embodiment of a process for displaying a list of fonts. In the example shown, a user interface via which a list of fonts is displayed is able to display the list in simple sorted order or in prefix savvy sorted order. At 400, sort mode is determined. In some embodiments, a sort mode is set to a default mode or the mode that was set the last time an application or interface was used. For example, an application or user interface may remember a user's preferences from a previous session and retain those settings. A variety of techniques may be used to specify or otherwise specify a sort mode. For example, a dialog box, pull down menu, and/or keyboard "quick key" input may be used to specify a sort mode.

If simple sort is used, at 402 a list of fonts is displayed alphabetically based on an entire name. In some embodiments, a list of fonts includes fonts that are available to a user (e.g., fonts that are included for free with an application and/or fonts that have been purchased by a user).

Otherwise, if prefix savvy sort is used, at 404, prefixes are obtained for a list of fonts. In some embodiments, prefixes are defined or otherwise obtained using information included in a field defined by or otherwise associated with a font standard. For example, font standards are used to describe (e.g., to a computer display system) how a particular font should be displayed. In some cases, each font has its own file encoded according to a particular font standard with information for that font included in the file. Some examples of font standards include PostScript (Type 1 and Type 3), TrueType and OpenType. In some embodiments, one or more fields are defined in a font standard and are used to describe a prefix and/or remainder portion of a name. Any appropriate technique may be used to describe, communicate or otherwise indicate a prefix and/or remainder portion. In some embodiments there is a name field and another field is used to describe the number of words in a name (e.g., separated by white spaces) that are included in a prefix (e.g., 0 for the font Georgia or 1 for the font ITC Garamond). In some embodiments, one field contains a prefix portion (e.g., an empty set for the font Georgia or ITC for the font ITC Garamond) and another field contains a remainder portion (e.g., Georgia for the font Georgia or Garamond for the font ITC Garamond).

Display parameters and/or settings are obtained at 406. In some embodiments, the display parameters and/or settings are associated with displaying a prefix portion and/or a remainder portion. In some embodiments, this information is obtained from an application. In some embodiments, a user is able to change or adjust how a prefix portion and/or a remainder portion are displayed. For example, in some embodiments, a user is able to turn on/off or adjust font color, font size, underlines, italics, bolds, blinking, parentheses, columns, etc. In some embodiments, settings are saved so that when an application is run later, settings that were obtained previously are used.

At 408, a list of fonts is displayed alphabetically based on a remainder portion, with the prefix portion (if any) and remainder portion displayed using different display properties. For example, in some embodiments, display at 408 is based on display parameters and/or settings. In some embodiments, a prefix portion is de-emphasized, for example by using a lighter color font. In some embodiments, a remainder portion is emphasized and/or attention is drawn to it. For example, some or all of a remainder portion is emphasized using a highlight, underline, bold, italic, etc. In some embodiments, a display property is associated with placement or layout. For example, in some embodiments a prefix portion and a remainder portion are displayed in different columns. In some embodiments, characters such as parentheses ( ) square brackets [ ], curly braces { }, or angle brackets < > are used. For example, (ITC) Garamond or ITC [Garamond].

In some embodiments, a presorted list of fonts is kept so that simple or prefix savvy sorting does not need to be performed every time a list of fonts is displayed. For example, in some cases a list of fonts rarely changes and a presorted list is used at 402 and/or 408. In some embodiments, a list of fonts changes, for example because a user buys a new font or a font is removed or deleted. In some embodiments, prior to fetching or using a presorted list of fonts to display, some checking is performed to ensure that a list of fonts has not changed. For example, in some cases a directory associated with fonts is checked prior to obtaining a presorted list to ensure that no fonts have been added or deleted.

In some embodiments, fonts that are potentially available to a user but not currently so are displayed with this indicated. For example, in some embodiments, fonts that have not yet been purchased are displayed with some indication (e.g., a star next to the name, the font name is displayed using a different color or a lighter shade, etc.). After purchasing or otherwise obtaining a font, the indication is removed or changes. In some cases this is useful because, for example, a list does not need to be resorted when a new font is purchased or otherwise obtained. It may also be helpful in some cases to make a user aware of other fonts that can be purchased or obtained, for example if the current set of fonts that are being used are insufficient or do not have some desired aesthetic or characteristic.

Figure 5:
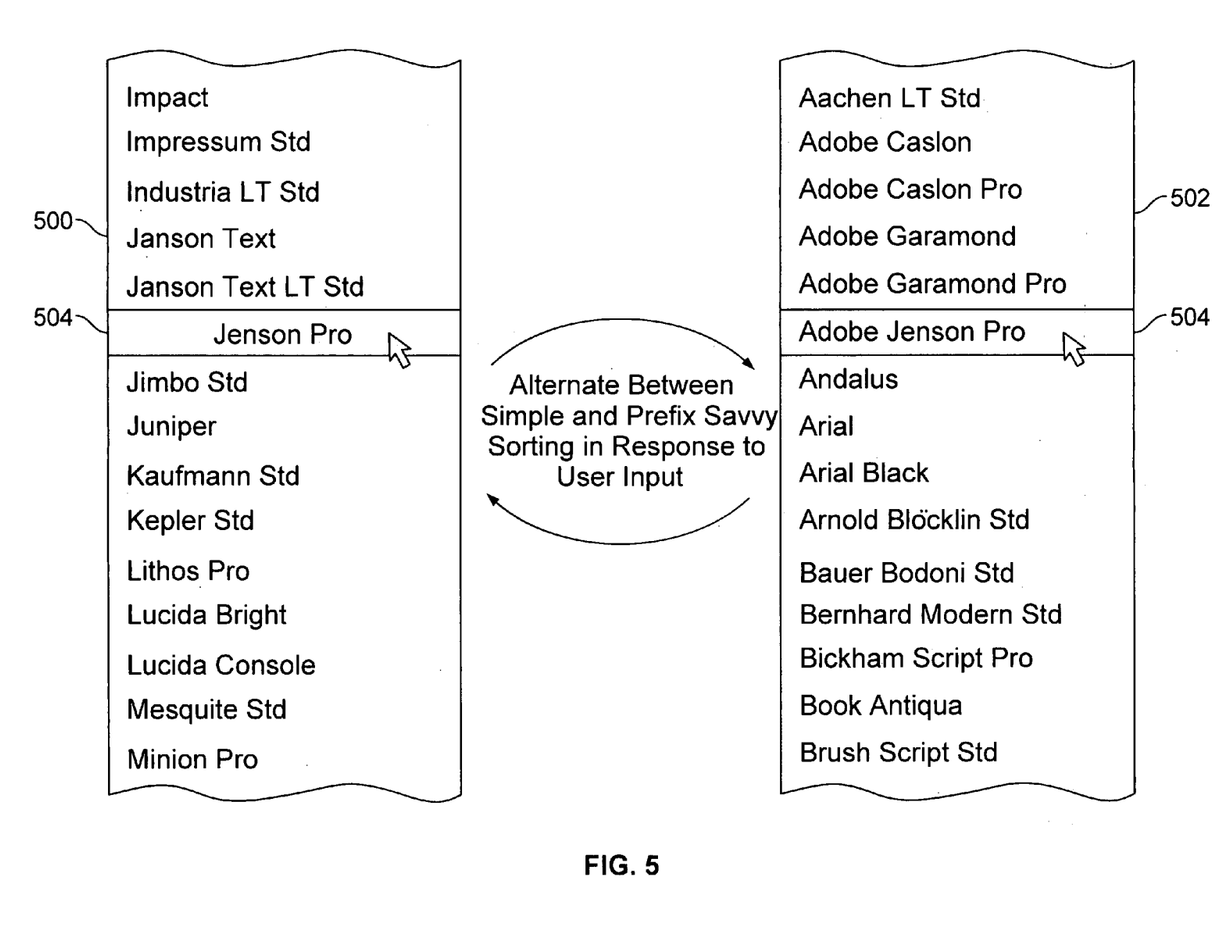
FIG. 5 is a diagram illustrating an embodiment of alternating between displaying a list of fonts in prefix savvy sorted order and in simple sorted order.

FIG. 5 is a diagram illustrating an embodiment of alternating between displaying a list of fonts in prefix savvy sorted order and in simple sorted order. In the example shown, font list 500 is sorted in prefix savvy sorted order. A user has placed his mouse over or otherwise selected the font Adobe Jenson Pro. Using an appropriate input signal, a user is able to change or otherwise cause a display to be refreshed or redrawn so that font list 502 is displayed instead of font list 500. Font list 502 is displayed in simple sorted order where prefix portions of font names are used to alphabetize font names. With font list 502 displayed, if an appropriate input signal is received, a display is redrawn or refreshed to display font list 500. As shown by this example, in some embodiments, a user is able to alternate between a simple and prefix savvy sorted list of fonts.

In this example, it is not necessary for a user to go through or otherwise re-access a list of fonts when display alternates between font list 500 and 502. For example, to access or otherwise view a font list, a user in some cases must traverse through one or more selections in a user interface. Referring to the example of FIG. 1, the selection Type from the main menu of the interface is selected, and then the selection Font is selected. This may be undesirable to a user when alternating between font lists, particularly if there are many selections that must be made in order to display a list of fonts. In some embodiments, a display alternates between font lists without requiring a user to re-access or re-traverse a sequence of selections. In some embodiments, a user must re-access a font list by again selecting a sequence of choices in a user interface. For example, in some cases, to redraw or otherwise redisplay a font list sorted according to a different sort order, a resource associated with a font list must be released and/or a font list must stop being displayed (e.g., closed and reopened).

In this example, font list 500 and 502 are displayed with an object displayed at a common or constant location when alternating between the font lists. In some embodiments, a common or constant location is where a mouse or other cursor is located, or is associated with a font that is currently selected. The font Adobe Jenson Pro (504) is displayed at the same height in font list 500 and 502. In some applications this is desirable since it may be less disorienting to have at least one font name still be displayed at the same location when alternating between font list 500 and 502. In some applications, this may also assist a user in finding a desired font more quickly. For example, font list 500 and 502 may be very long. If a user wants to find the font Adobe Caslon, in some cases it is faster to switch from font list 500 to font list 502 with Adobe Jenson Pro (504) at a constant location rather than scrolling up/down through font list 500 to get to the C section where Adobe Caslon is located within prefix savvy sorted font list 500. Conversely, in some cases a user may want to switch from font list 502 to font list 500 to quickly view other fonts (if any) near Adobe Jenson Pro (504) that have Jenson in the font name.

In font list 500, the prefix portion and the remainder portion of font names are displayed using different display properties. The prefix portion (e.g., Adobe) is displayed in this example using a lighter color than the remainder portion (e.g., Jenson Pro) so that the two portions are distinguishable from each other. In font list 502, different display properties are not used and the entire font name of Adobe Jenson Pro (504) is displayed using a single color.

In some embodiments, a tool tip or other mechanism for instructing a user on how to toggle between font list 500 and 502 is used. For example, in some embodiments, when a user moves her cursor over a prefix portion of a font name, a tool tip pops up. In one example, the tool tip says, "Press SHIFT to toggle between simple sort and prefix savvy sort." In some embodiments, some other prescribed region (e.g., in addition to or as an alternative to a prefix portion) causes a tool tip to pop up. In some embodiments, some other mechanism is used to instruct or educate a user about prefix savvy sorting and/or how to change the sort method that is used. For example, some applications or interfaces are configured to have an entry in a help database or collection of articles, and a search for "font sorting," "sorting," or "prefix savvy sort" brings up instructions on how to alternate between font list 500 and 502. Techniques such as these are useful in educating users and users are then able to configure an application or interface according to their preferences.

In some embodiments, the same user input causes a display to toggle between font list 500 and font list 502. For example, some displays are configured to alternate between font list 500 and font list 502 when the shift key or some other key combination is pressed. In some embodiments, three or more sort orders are cycled through or are otherwise capable of being displayed. If font list 500 is displayed, then the display is refreshed to display font list 502 when the shift key is pressed. Conversely, if font list 502 is displayed and the shift key is pressed, the display is refreshed to display font list 500. In some embodiments, display of each font list is associated with a particular user input. For example, some displays are configured to display font list 500 when the shift key is pressed and display font list 502 when the control key is pressed.

In some embodiments, the example techniques are used with some other list besides a list of fonts. Any list of items may be displayed such that a first portion and a second portion of items in the list are distinguishable from each other using different display properties. Any list may alternate between a first sort order and a second sort order using the techniques described herein. In some embodiments, a list is a list of resources such as a list of devices, printers, storage, people, etc.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    obtaining, at a processor, (1) a first font name which includes a prefix portion and a remainder portion and (2) a second font name that includes a remainder portion but does not include a prefix portion;
    sorting, at the processor, the first font name and the second font name into a sorted order based at least in part on the remainder portion of the first font name and the remainder portion of the second font name without considering the prefix portion of the first font name; and
    displaying the first font name and the second font name in the sorted order, wherein the prefix portion of the first font name is displayed using a first display property and the remainder portion of the first font name and the remainder portion of the second font name are displayed using a second display property.

2. A method as recited in claim 1, wherein the prefix portion of the first font name includes at least one of the following: the word "New", the word "Neue", a name of a font foundry, or a name of a font designer.

3. A method as recited in claim 1, wherein:
the first display property is associated with a first column and the second display property is associated with a second column; and
displaying includes:
aligning the prefix portion of the first font name to the first column; and
aligning the remainder portion of the first font name and the remainder portion of the second font name to the second column.

4. A method as recited in claim 1, wherein:
the first display property is associated with a first font color and the second display property is associated with a second font color; and
displaying includes:
displaying the prefix portion of the first font name in the first font color; and
displaying the remainder portion of the first font name and the remainder portion of the second font name in the second font color.

5. A method as recited in claim 1, wherein:
the first display property is associated with a first font transparency value and the second display property is associated with a second font transparency value; and
displaying includes:
displaying the prefix portion of the first font name using the first font transparency value; and
displaying the remainder portion of the first font name and the remainder portion of the second font name using the second font transparency value.

6. A method as recited in claim 1, wherein:
the first display property is associated with a first set of one or more display values associated with at least one of bolding, underlining, and font size and the second display property is associated with a second set of one or more display values associated with at least one of bolding, underlining, and font size; and
displaying includes:
displaying the prefix portion of the first font name using the first set of display values; and
displaying the remainder portion of the first font name and the remainder portion of the second font name using the second set of display values.

7. A method as recited in claim 1, wherein the prefix portion and the remainder portion of the first font name is defined in a file associated with the first font.

8. A method as recited in claim 1, wherein displaying occurs via a pull-down menu of a user interface.

9. A system, comprising:
an interface configured to obtain (1) a first font name which includes a prefix portion and a remainder portion and (2) a second font name that includes a remainder portion but does not include a prefix portion;
a processor configured to sort the first font name and the second font name into a sorted order based at least in part on the remainder portion of the first font name and the remainder portion of the second font name without considering the prefix portion of the first font name; and
a display configured to display the first font name and the second font name in the sorted order, wherein the prefix portion of the first font name is displayed using a first display property and the remainder portion of the first font name and the remainder portion of the second font name are displayed using a second display property.

10. A system as recited in claim 9, wherein:
the first display property is associated with a first column and the second display property is associated with a second column; and
the display is configured to display by:
aligning the prefix portion of the first font name to the first column; and
aligning the remainder portion of the first font name and the remainder portion of the second font name to the second column.

11. A system as recited in claim 9, wherein:
the first display property is associated with a first font color and the second display property is associated with a second font color; and
the display is configured to display by:
displaying the prefix portion of the first font name in the first font color; and
displaying the remainder portion of the first font name and the remainder portion of the second font name in the second font color.

12. A computer program product being embodied in a computer readable storage medium and comprising computer instructions for:
obtaining (1) a first font name which includes a prefix portion and a remainder portion and (2) a second font name that includes a remainder portion but does not include a prefix portion;
sorting the first font name and the second font name into a sorted order based at least in part on the remainder portion of the first font name and the remainder portion of the second font name without considering the prefix portion of the first font name; and
displaying the first font name and the second font name in the sorted order, wherein the prefix portion of the first font name is displayed using a first display property and the remainder portion of the first font name and the remainder portion of the second font name are displayed using a second display property.

13. A computer program product as recited in claim 12, wherein:
the first display property is associated with a first column and the second display property is associated with a second column; and
the computer instructions for displaying include computer instructions for:
aligning the prefix portion of the first font name to the first column; and
aligning the remainder portion of the first font name and the remainder portion of the second font name to the second column.

14. A computer program product as recited in claim 12, wherein:
the first display property is associated with a first font color and the second display property is associated with a second font color; and
the computer instructions for displaying include computer instructions for:
displaying the prefix portion of the first font name in the first font color; and
displaying the remainder portion of the first font name and the remainder portion of the second font name in the second font color.

15. A method, comprising:
obtaining, at a processor, a list of fonts that includes (1) a first font name which includes a prefix portion and a remainder portion and (2) a second font name that includes a remainder portion but does not include a prefix portion;
displaying the list of fonts sorted according to a first sort order, wherein each font name in the list of fonts includes one or more words having an order;
receiving an indication to display the list of fonts sorted according to a second sort order; and
displaying the list of fonts sorted according to the second sort order, wherein the order of words in a font name does not change when displaying the list of fonts sorted according to the first sort order and when displaying the list of fonts sorted according to the second sort order, wherein:
   one of the first sort order and the second sort order includes a simple sort order where the first font name and the second font name are sorted based at least in part on the prefix portion of the first font name and the remainder portion of the second font name; and
   the other sort order which does not includes the simple sort order includes a prefix savvy sort order where the first font name and the second font name are sorted based at least in part on the remainder portion of the first font name and the remainder portion of the second font name without considering the prefix portion of the first font name.

16. A method as recited in claim 15 further comprising displaying a tool tip associated with alternating between the displaying the list of fonts sorted according to the first sort order and the second sort order in response to placement of a cursor over a prescribed region.

17. A method as recited in claim 15, wherein the list of fonts is associated with a menu of a user interface.

18. A method as recited in claim 15, wherein:
displaying the list of fonts sorted according to the first sort order is in response to selection of a sequence of one or more selections associated with a user interface; and
displaying the list of fonts sorted according to the second sort order is performed without requiring the sequence of one or more selections associated with the user interface to be re-selected.

19. A method as recited in claim 15, wherein a font name in the list of fonts is displayed in a same location when (1) displaying the list of fonts sorted according to the first sort order and when (2) displaying the list of fonts sorted according to the second sort order.

20. A method as recited in claim 15, wherein a font name in the list of fonts is displayed in a same location when (1) displaying the list of fonts sorted according to the first sort order and when (2) displaying the list of fonts sorted according to the second sort order, and said font name includes a selected font.

21. A method as recited in claim 15, wherein the list of fonts sorted according to the first sort order is displayed in response to a first user input and the list of fonts sorted according to the second sort order is displayed in response to a second user input.

22. A method as recited in claim 15, wherein display toggles between the list of fonts sorted according to the first sort order and the list of fonts sorted according to the second sort order in response to a user input.

23. A computer program product being embodied in a computer readable storage medium and comprising computer instructions for:
displaying a list of fonts sorted according to a first sort order, wherein each font name in the list of fonts includes one or more words having an order;
receiving an indication to display the list of fonts sorted according to a second sort order; and
displaying the list of fonts sorted according to the second sort order, wherein the order of words in a font name does not change when displaying the list of fonts sorted according to the first sort order and when displaying the list of fonts sorted according to the second sort order, wherein:
   one of the first sort order and the second sort order includes a simple sort order where the first font name and the second font name are sorted based at least in part on the prefix portion of the first font name and the remainder portion of the second font name; and
   the other sort order which does not includes the simple sort order includes a prefix savvy sort order where the first font name and the second font name are sorted based at least in part on the remainder portion of the first font name and the remainder portion of the second font name without considering the prefix portion of the first font name.

24. A computer program product as recited in claim 23, wherein a font name in the list of fonts is displayed in a same location when (1) displaying the list of fonts sorted according to the first sort order and when (2) displaying the list of fonts sorted according to the second sort order.

25. A computer program product as recited in claim 23, wherein a font name in the list of fonts is displayed in a same location when (1) displaying the list of fonts sorted according to the first sort order and when (2) displaying the list of fonts sorted according to the second sort order, and said font name includes a selected font.

* * * * *